(12) United States Patent
Manjunath

(10) Patent No.: US 10,554,755 B2
(45) Date of Patent: Feb. 4, 2020

(54) AIRCRAFT DATA INTERFACE FUNCTION IMPLEMENTATION USING AIRCRAFT CONDITION MONITORING FUNCTION AND DATA GATHERING APPLICATION ARCHITECTURE

(71) Applicant: Honeywell International Inc., Morris Plains, NJ (US)

(72) Inventor: Harisha Bangalore Manjunath, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 469 days.

(21) Appl. No.: 15/153,877

(22) Filed: May 13, 2016

(65) Prior Publication Data

US 2017/0331895 A1 Nov. 16, 2017

(51) Int. Cl.
*G06F 15/173* (2006.01)
*H04L 29/08* (2006.01)
(Continued)

(52) U.S. Cl.
CPC .............. *H04L 67/12* (2013.01); *H04L 12/40* (2013.01); *H04L 41/0213* (2013.01); *H04L 67/42* (2013.01); *H04L 2012/4028* (2013.01)

(58) Field of Classification Search
CPC ...... H04L 12/40; H04L 41/0213; H04L 67/42
(Continued)

(56) References Cited

U.S. PATENT DOCUMENTS 7,756,145 B2 7/2010 Kettering et al.
8,190,727 B2 5/2012 Henkel
(Continued)

FOREIGN PATENT DOCUMENTS

EP 2527977 11/2012

OTHER PUBLICATIONS

Title: ARINC Specification 834-5 Aircraft Data Interface Function ADIF Publication date: Jul. 28, 2015 Prepared by AEEC, published by SAE-ITC.*
(Continued)

*Primary Examiner* — Umar Cheema
*Assistant Examiner* — Hannah S Wang
(74) *Attorney, Agent, or Firm* — Bookoff McAndrews, PLLC

(57) ABSTRACT

An aircraft data interface function (ADIF) server system comprises a processing module that hosts an aircraft condition monitoring function, comprising an airline modifiable information database including a history buffer and one or more logic units; a management information base (MIB) database; a parameter snapshot database; and a simple network management protocol (SNMP) agent in communication with the MIB database and parameter snapshot database. A core network unit communicates with the SNMP agent and an SNMP manager in an ADIF client. The SNMP agent sends messages to and receives messages from the SNMP manager through the core network unit. The ADIF server system interfaces with one or more avionics systems through a common data network to obtain and store aircraft parameter information. The ADIF client is configured via the core network unit to interact with the ADIF server system to request and receive the aircraft parameter information.

19 Claims, 2 Drawing Sheets

(51) Int. Cl.
*H04L 12/40* (2006.01)
*H04L 12/24* (2006.01)
*H04L 29/06* (2006.01)

(58) Field of Classification Search
USPC ........................................................ 709/203
See application file for complete search history.

(56) References Cited

U.S. PATENT DOCUMENTS

| | | | |
|---|---|---|---|
| 2008/0013705 A1* | 1/2008 | Yoffie | G06Q 10/109 |
| | | | 379/201.12 |
| 2008/0177439 A1* | 7/2008 | Betters | G01C 23/005 |
| | | | 701/33.4 |
| 2009/0073984 A1 | 3/2009 | Jackson | |
| 2010/0057899 A1 | 3/2010 | Henkel | |
| 2011/0176617 A1 | 7/2011 | Fagan et al. | |
| 2013/0173828 A1* | 7/2013 | Todd | H04L 67/125 |
| | | | 710/5 |

OTHER PUBLICATIONS

Title: AFDX/ARINC 664 Concept, Design, Implementation and Beyond Publication date: Jan. 22, 2007 Author: Detlev Schaadt Type: White Paper.*
Title: Design and realization of aircraft interface device Publication date: 2015 Author: Tomas Jankech, Brno University of Technology.*
European Patent Office, "Extended European Search Report from EP Application No. 17167156.3, dated Oct. 16, 2017", from Foreign Counterpart of U.S. Appl. No. 15/153,877, filed Oct. 16, 2017, pp. 1-8, Published in: EP.
Ke et al, "Embedded Network Management System Design Based on Web", 2009 International Conference on Signal Processing Systems, May 15-17, 2009, pp. 366-369, Publisher: IEEE Computer Society.
Jensen David, "B787 Cockpit: Boeing's Bold Move", Nov. 1, 2005, pp. 1-5, Publisher: Avionics Magazine, Published in: US.
Teledyne Controls, "Flight Data Interface Management Unit (FDIMU) for Airbus Aircraft", Jan. 21, 2016, p. 1 Published in: El Segundo, California.

* cited by examiner

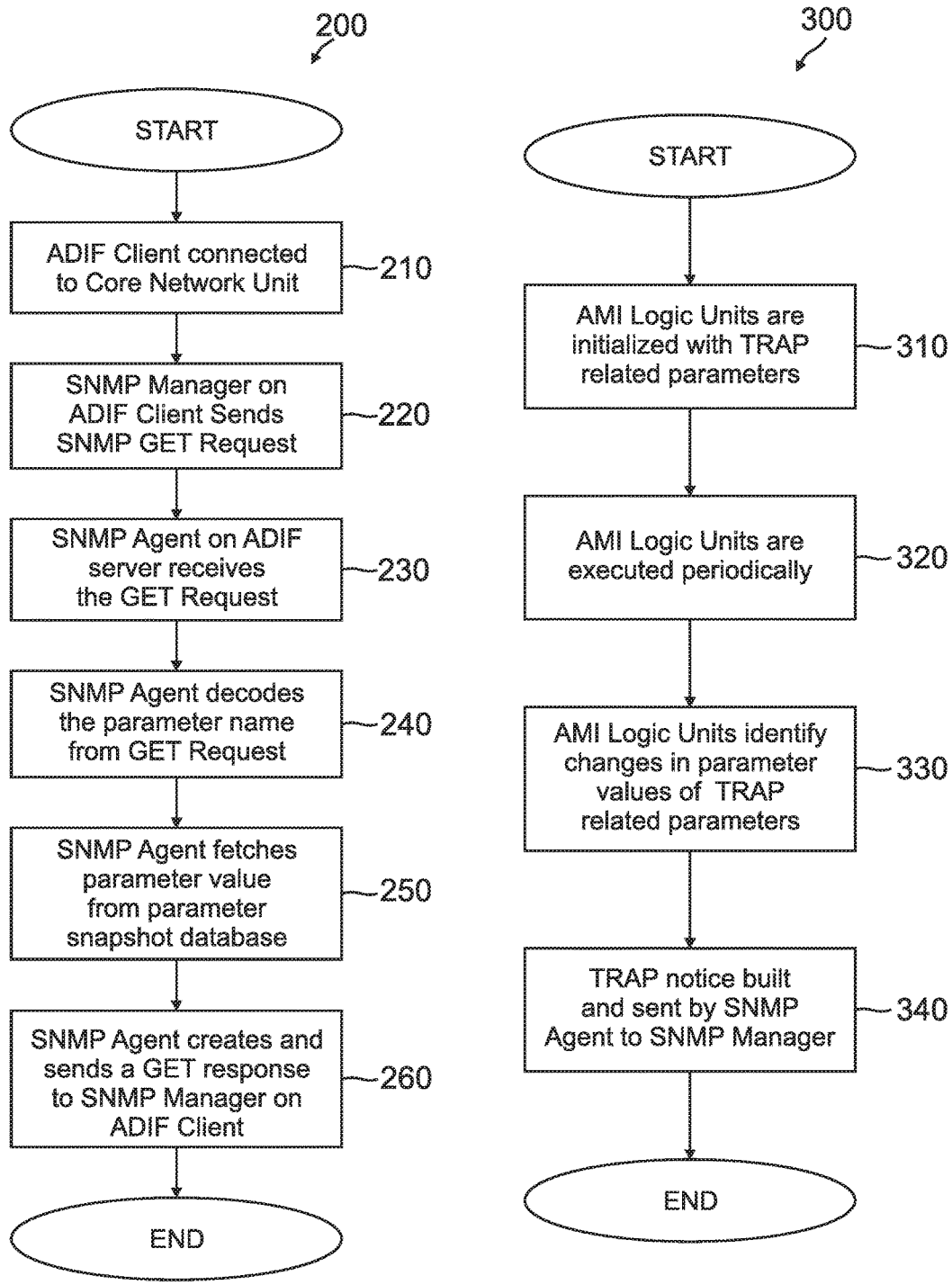

AIRCRAFT DATA INTERFACE FUNCTION IMPLEMENTATION USING AIRCRAFT CONDITION MONITORING FUNCTION AND DATA GATHERING APPLICATION ARCHITECTURE

BACKGROUND

An aircraft data interface function (ADIF) can be visualized as an avionics bus data to Ethernet converter. The ADIF interfaces between avionics equipment and non-avionics equipment like an electronic flight bag, thereby isolating the avionics domain from external applications. The ADIF architecture currently available is designed such that all line replaceable units are physically connected to an ADIF server. There is always a limitation on the number of line replaceable units that can be physically connected to any device, which in turn permits the ADIF server to be able to serve only a limited number of parameters depending on the hardware specification. This inhibits the ADIF server from serving the parameters requested by external applications. Also, adding a new line replaceable unit to the ADIF server requires that physical connections be done to the ADIF server. Further, the currently existing design of the ADIF is resistant to change, is hardware dependent, and does not fully perform as an aircraft interface device.

SUMMARY

An aircraft data interface function (ADIF) server system comprises a processing module that hosts an aircraft condition monitoring function, comprising an airline modifiable information database that includes a history buffer and one or more logic units; a management information base (MIB) database; a parameter snapshot database; and a simple network management protocol (SNMP) agent in operative communication with the MIB database and the parameter snapshot database. A core network unit is in operative communication with the SNMP agent, with the core network unit configured to communicate with an ADIF client that includes an SNMP manager. The SNMP agent is configured to send messages to and receive messages from the SNMP manager through the core network unit. The ADIF server system is configured to interface with one or more avionics systems through a common data network to obtain and store aircraft parameter information. The ADIF client is configured via the core network unit to interact with the ADIF server system to request and receive the aircraft parameter information.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 2 is a flow diagram for a simple network management protocol (SNMP) GET request method employed by the ADIF of FIG. 1; and FIG. 3 is a flow diagram for an SNMP TRAP request method employed by the ADIF of FIG. 1.

DETAILED DESCRIPTION

Figure 1:
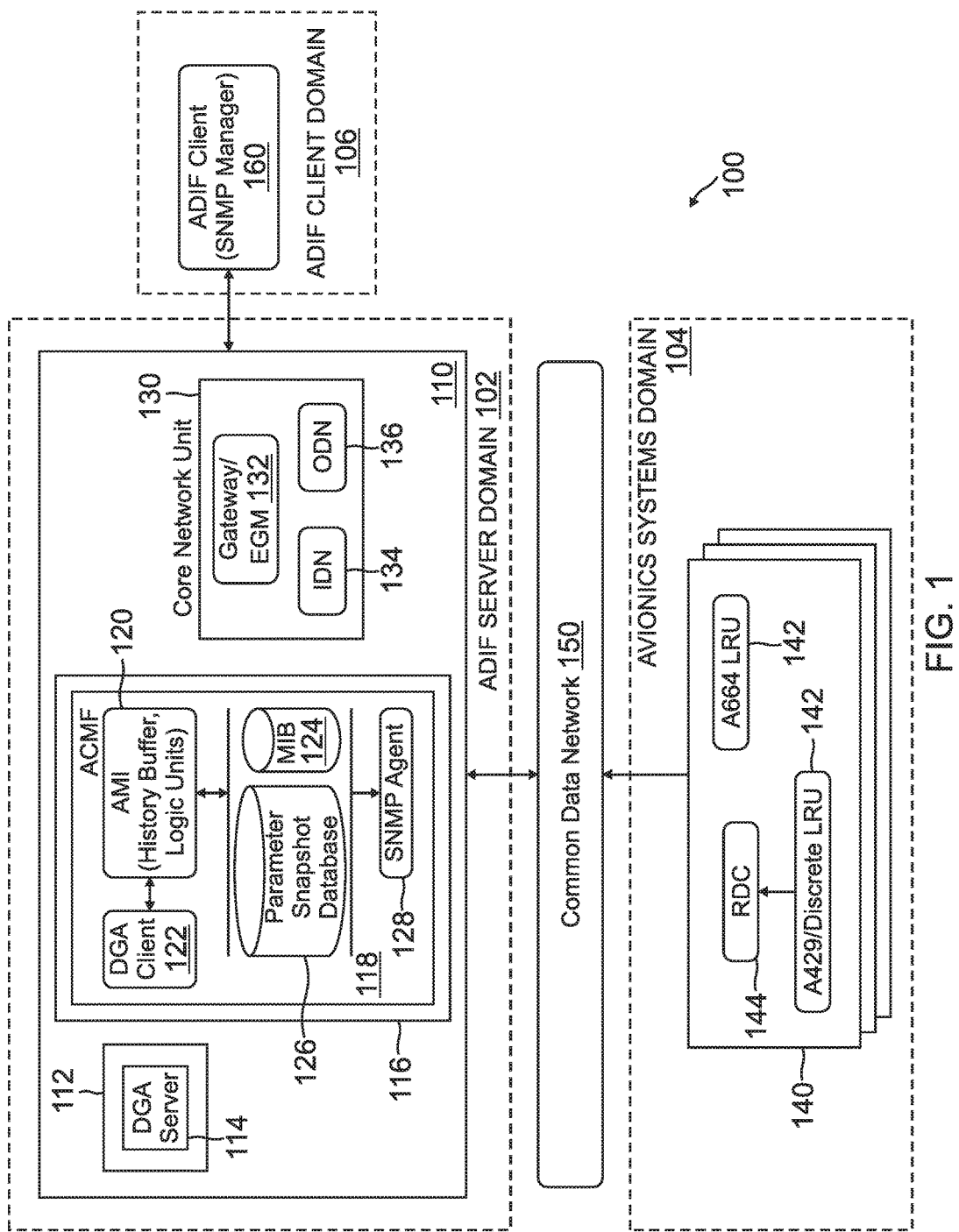
FIG. 1 is a block diagram of a system that implements an aircraft data interface function (ADIF) by utilizing enhancements to an aircraft condition monitoring function (ACMF) and data gathering application (DGA) architecture, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and methods for an aircraft data interface function (ADIF) implementation is provided, which utilizes enhancements to an aircraft condition monitoring function (ACMF) and data gathering application (DGA) architecture. The enhancements enable the ACMF and DGA architecture to function as an ADIF server in an aircraft. The ADIF server is configurable to collect parameters from line replacement units in the aircraft. The parameters can also be collected from aircraft systems hosted on various avionics busses. The ADIF server provides any required aircraft parameter information and can serve as an aircraft parameter database.

The ADIF server functions as an avionics bus data to Ethernet converter, and interfaces with the line replaceable units in an aircraft to provide aircraft parameters to requesting applications over an Ethernet line. The ADIF server can be implemented to host various services, such as a generic aircraft parameter service, a simple text avionics protocol, and an avionics data broadcast protocol. The ADIF server can be compliant with industry standards, such as ARINC 834 supplement 3, if the server implements one or more of the foregoing services.

The ADIF server includes a simple network management protocol (SNMP) layer, which is part of the generic aircraft parameter service (GAPS). The SNMP layer is integrated with the existing aircraft condition monitoring function and data gathering application architecture.

The GAPS provides aircraft parameters in engineering format to applications on request via the SNMP layer. The GAPS is a read-only data service, wherein an application can only read the parameter values. The parameters returned by this service are not time stamped.

The simple text avionics protocol (STAP) service can be used by applications to initiate periodic delivery of aircraft parameters. Parameters are delivered to each application as ASCII strings and include a time stamp for the time the parameter was received. The STAP service also offers application features for control of hardware discrete, access to raw ARINC 429 parameters, and interactive communications between applications. The STAP service offers both read and write operations.

The avionics data broadcast protocol (ADBP) provides applications with periodic delivery of time-stamped aircraft parameters. The ADBP delivers aircraft parameters as extensible markup language (XML) objects. The ADBP does not support control of discrete, raw data delivery, or communications to avionics. The ADBP is a read-only data service.

Applications, such as an electronic flight bag (EFB) in a portable device, an inflight entertainment server, or a cabin management system, interface with the GAPS to get generic aircraft parameters. The GAPS functionality is implemented over the SNMP layer, wherein the ADIF server acts as an SNMP agent and the requesting application is an SNMP manager.

The present approach can be implemented in existing software already used in aircraft. Thus, only the SNMP agent needs to be certified, so the cost of certification is very minimal. In addition, no hardware change is needed, so hardware certification is eliminated. The present implementation also allows for a line replaceable unit to be easily plugged and unplugged in the avionics systems.

Further details of the present system and methods are described hereafter with reference to the drawings.

FIG. 1 depicts the general architecture of a system 100 that implements the present ADIF approach according to one embodiment. The system 100 generally includes an ADIF server domain 102, an avionics systems domain 104, and an ADIF client domain 106.

The ADIF server domain 102 includes an ADIF server system 110, which generally comprises a first processing module 112 that hosts a data gathering application (DGA) server 114, a second processing module 116 that hosts an enhanced aircraft condition monitoring function (ACMF) 118, and a core network unit 130.

The avionics systems domain 104 includes one or more avionics systems 140 comprising various avionics buses 142, such as A429/discrete LRUs, A664 LRUs, and other discrete busses. A remote data concentrator (RDC) 144 is operatively coupled to avionics busses 142.

The ADIF client domain 106 includes and ADIF client 160, which can be embedded in a portable device, such as an EFB, or in other systems such as an inflight entertainment server, a cabin management system, or the like. The ADIF client 160 interacts with ADIF server system 110 to get requested aircraft parameters.

The avionics data generated by avionics systems 140 is accessible to ADIF server system 110 via a common data network 150. The DGA server 114 in ADIF server system 110 is configured to interface with avionics systems 140 through common data network 150 to obtain aircraft parameter information.

The ACMF 118 in ADIF server system 110 includes an airline modifiable information (AMI) database 120, which is an airline configurable database. The AMI database 120 includes a history buffer, and users can configure one or more logic units, event trigger reports, manual reports, continuous parameter recordings, and a user display. A DGA client layer 122 is in operative communication with AMI database 120. The DGA client layer 122 sends parameter requests to DGA server 114, based on information from AMI database 120 or a user request. The DGA server 114 processes the parameter requests, retrieves the requested parameter information from common data network 150, and sends a response back to DGA client layer 122.

The AMCF 118 also includes a management information base (MIB) database 124. The AMI database 120 and MIB database 124 are configured to collect any available aircraft parameters. A parameter snapshot database 126 is also located in AMCF 118. A simple network management protocol (SNMP) agent 128 in AMCF 118 is in operative communication with MIB database 124 and parameter snapshot database 126. The SNMP agent 128 is configured to process received requests for parameter information, and retrieve parameter values for the received requests from parameter snapshot database 126. The MIB database 124 stores a plurality of aircraft parameters provided by SNMP agent 128, and serves as a database for the received requests.

In one embodiment, parameter snapshot database 126 can be implemented with parameter names and values stored within the AMI history buffer, and a software interface is additionally provided by AMI 120. The SNMP agent 128 can then fetch parameter information via this software interface.

The core network unit 130 is in operative communication with SNMP agent 126, and is configured to communicate with an SNMP manager in ADIF client 160. The core network unit 130 acts as a gateway and isolates the data between common data network 150 and other networks. In one embodiment, core network unit 130 includes an Ethernet gateway module (EGM) 132. The core network unit 130 also hosts an isolated data network (IDN) 134, and an open data network (ODN) 136, where an external portable device such as an EFB can be connected. The core unit 130 can also host a wireless unit to enable the portable device to be wirelessly connected.

The generic aircraft parameter service (GAPS) serves the parameter information to the client via GET and TRAP requests. The GET and TRAP are SNMP commands that are used to communicate between the SNMP manager in ADIF client 160 and the SNMP agent 128. The GET request can include, for example, the SNMP manager sending a request to the SNMP agent to fetch aircraft parameter information, such as airline identification, aircraft type, aircraft tail number, etc. A TRAP request can be set up, for example, to automatically send a notification from the SNMP agent to the SNMP manager when an aircraft parameter change occurs, such as a flight phase change, or other similar aircraft parameter changes that require event notification. In one embodiment, AMI logic units can be configured with all the TRAP requests from MIB database 124.

FIG. 2 is a flow diagram for an SNMP GET method 200. At the start of method 200, an ADIF client is connected to core network unit (block 210), and the SNMP manager on the ADIF client sends an SNMP GET request (block 220). The SNMP agent on the ADIF server receives the GET request from the ADIF client (block 230), and the SNMP agent decodes a parameter name from the GET request (block 240). The SNMP agent fetches the parameter value from the parameter snapshot database (block 250). The SNMP agent then creates and sends a GET response to the SNMP manager on the ADIF client (block 260), after which method 200 ends.

FIG. 3 is a flow diagram for an SNMP TRAP method 300. At the start of method 300, AMI logic units are initialized with TRAP related parameters (block 310). The AMI logic units are executed periodically (block 320), and the AMI logic units identify changes in parameter values of the TRAP related parameters (block 330). A trap notification is then built by the SNMP agent, based on the changes in parameter values, and the trap notification is sent to the SNMP manager (block 340), after which method 300 ends.

The AMI database and MIB database should be in synchronization so that the SNMP GET request and TRAP events are handled correctly. Both of the AMI database and the MIB database need to be synchronized manually by the user.

The user looks into the MIB database, fetches all the parameters that are part of a GET and TRAP request, and manually adds each of the parameters to a customizable parameter database component of the AMI database. The user also looks into the MIB database, fetches all the parameters that are part of a TRAP request, and manually creates a logic unit that looks for a value change of those parameters and triggers the TRAP event.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes an aircraft data interface function (ADIF) server system, comprising: a processing module that hosts an aircraft condition monitoring function that comprises an airline modifiable information (AMI) database that includes a history buffer and one or more logic units; a management information base (MIB) database; a parameter snapshot database; and a simple network management protocol (SNMP) agent in operative communication with the MIB database and the parameter snapshot database. A core network unit is in operative communication with the SNMP agent, with the core network unit configured to communicate with an ADIF client that includes an SNMP manager, wherein the SNMP agent is configured to send messages to and receive messages from the SNMP manager through the core network unit. The ADIF server system is configured to interface with one or more avionics systems through a common data network to obtain and store aircraft parameter information, and the ADIF client is configured via the core network unit to interact with the ADIF server system to request and receive the aircraft parameter information.

Example 2 includes the system of Example 1, further comprising a data gathering application server configured to interface with the one or more avionics systems through the common data network to obtain the aircraft parameter information. The aircraft condition monitoring function further comprises a data gathering application client layer configured to send parameter requests to the data gathering application server.

Example 3 includes the system of Example 2, wherein the data gathering application server is configured to process the parameter requests, retrieve parameter information from the common data network based on the processed parameter requests, and send the parameter information to the data gathering client layer.

Example 4 includes the system of any of Examples 1-3, wherein the SNMP agent is configured to receive and process a request for parameter information from the SNMP manager in the ADIF client through the core network unit, retrieve one or more parameter values from the parameter snapshot database based on the processed request, and create and send a response with the one or more parameter values to the ADIF client through the core network unit.

Example 5 includes the system of any of Examples 1-4, wherein the SNMP agent is configured to initialize one or more AMI logic units with one or more trap related parameters, execute the one or more AMI logic units periodically, identify any changes in parameter values of the trap related parameters with the one or more AMI logic units, generate a trap notification based on the changes in parameter values, and send the trap notification to the SNMP manager in the ADIF client.

Example 6 includes the system of any of Examples 1-5, wherein the aircraft condition monitoring function is configured to host a generic aircraft parameter service (GAPS).

Example 7 includes the system of any of Examples 1-6, wherein the one or more avionics systems comprise a plurality of avionics busses, and a remote data concentrator operatively coupled to the avionics busses.

Example 8 includes the system of Example 7, wherein the avionics busses comprise aircraft line replaceable units.

Example 9 includes the system of any of Examples 1-8, wherein the ADIF client is implemented in a portable device, an inflight entertainment server, or a cabin management system.

Example 10 includes the system of Example 9, wherein the portable device comprises an electronic flight bag.

Example 11 includes the system of any of Examples 1-10, wherein the ADIF client connects with the core network unit over an Ethernet line.

Example 12 includes the system of any of Examples 1-10, wherein the ADIF client wirelessly connects with the core network unit.

Example 13 includes a method for obtaining avionics data from an aircraft in which an aircraft data interface function (ADIF) client is connected to an ADIF server, the ADIF client including a simple network management protocol (SNMP) manager and the ADIF server including an SNMP agent, the method comprising: receiving, at the SNMP agent, a parameter request from the SNMP manager; decoding, in the SNMP agent, a parameter name from the parameter request; retrieving a parameter value, based on the decoded parameter name, from a parameter snapshot database; creating a response with the retrieved parameter value in the SNMP agent; and sending the response from the SNMP agent to the SNMP manager.

Example 14 includes the method of Example 13, wherein the ADIF client is implemented in a portable device, an inflight entertainment server, or a cabin management system.

Example 15 includes the method of Example 14, wherein the portable device comprises an electronic flight bag.

Example 16 includes the method of any of Examples 13-15, wherein the ADIF client is connected to the ADIF server over an Ethernet line.

Example 17 includes the method of any of Examples 13-15, wherein the ADIF client is wirelessly connected to the ADIF server.

Example 18 includes the method of any of Examples 13-17, further comprising initializing one or more logic units in the ADIF server with one or more trap related parameters, executing the one or more logic units periodically, identifying any changes in parameter values of the trap related parameters with the one or more logic units, generating a trap notification based on the changes in parameter values in the SNMP agent, and sending the trap notification from the SNMP agent to the SNMP manager.

Example 19 includes the method of any of Examples 13-18, wherein the ADIF server further includes a data gathering application server that is configured to interface with one or more avionics systems through a common data network to obtain aircraft parameter information.

Example 20 includes the method of any of Examples 13-19, wherein the ADIF server further includes an aircraft condition monitoring function that is configured to host a generic aircraft parameter service (GAPS).

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An aircraft data interface function (ADIF) server system, comprising:
    a data gathering application (DGA) server configured to interface with one or more avionics systems through a data network to obtain aircraft parameter information;
    a processor for executing program instructions stored on a memory that hosts an aircraft condition monitoring function comprising:
        an airline modifiable information (AMI) database that includes a history buffer and configurable parameters for one or more logic units, event trigger reports, manual reports, continuous parameter recordings, and a user display;
        a DGA client layer in operative communication with the AMI database, the DGA client layer configured to:
            send aircraft parameter information requests to the DGA server based on configured parameters of the AMI database or a user request;
            receive obtained aircraft parameter information from the DGA server; and
            store the received aircraft parameter information in the history buffer of the AMI database;
        a management information base (MIB) database configured to collect and store the stored aircraft parameter information from the history buffer of the AMI database;
        a parameter snapshot database including aircraft parameter names and aircraft parameter values of the aircraft parameter information stored within the history buffer of the AMI database; and
        a simple network management protocol (SNMP) agent in operative communication with the MIB database and the parameter snapshot database; and
    a gateway in operative communication with the SNMP agent, the gateway configured to communicate with a SNMP manager of the ADIF client,
    wherein the SNMP agent is configured to:
        receive, through the gateway, requests for aircraft parameter information from the SNMP manager of the ADIF client;
        retrieve, from the parameter snapshot database, aircraft parameter values of the requested aircraft parameter information; and
        send, through the gateway, the retrieved aircraft parameter values of the requested aircraft parameter information.

2. The system of claim 1, wherein the data gathering application server is configured to:
    process the requests for aircraft parameter information;
    retrieve aircraft parameter information from the data network based on the processed requests for aircraft parameter information; and
    send the aircraft parameter information to the data gathering application client layer.

3. The system of claim 1, wherein the SNMP agent is further configured to:
    process a request for aircraft parameter information;
    retrieve one or more aircraft parameter values of the aircraft parameter information from the parameter snapshot database based on the processed request; and
    create and send a response with the one or more aircraft parameter values to the ADIF client through the gateway.

4. The system of claim 1, wherein the SNMP agent is further configured to:
    initialize one or more AMI logic units with one or more trap related parameters;
    execute the one or more AMI logic units periodically;
    identify any changes in aircraft parameter values of the trap related parameters with the one or more AMI logic units;
    generate a trap notification based on the changes in aircraft parameter values; and
    send the trap notification to the SNMP manager of the ADIF client.

5. The system of claim 1, wherein the aircraft condition monitoring function is configured to host a generic aircraft parameter service (GAPS).

6. The system of claim 1, wherein the one or more avionics systems comprise a plurality of avionics busses, and a remote data concentrator operatively coupled to the avionics busses.

7. The system of claim 6, wherein the avionics busses comprise aircraft line replaceable units.

8. The system of claim 1, wherein the ADIF client is implemented in a portable device, an inflight entertainment server, or a cabin management system.

9. The system of claim 8, wherein the portable device comprises an electronic flight bag.

10. The system of claim 1, wherein the ADIF client connects with the gateway over an Ethernet line.

11. The system of claim 1, wherein the ADIF client wirelessly connects with the gateway.

12. A method for obtaining avionics data from an aircraft using an ADIF server system including:
    a data gathering application (DGA) server configured to interface with one or more avionics systems through a data network to obtain aircraft parameter information;
    a processor for executing program instructions stored on a memory that hosts an aircraft condition monitoring function comprising:
        an airline modifiable information (AMI) database that includes a history buffer and configurable parameters for one or more logic units, event trigger reports, manual reports, continuous parameter recordings, and a user display;

a DGA client layer in operative communication with the AMI database, the DGA client layer configured to:
send aircraft parameter information requests to the DGA server based on configured parameters of the AMI database or a user request;
receive obtained aircraft parameter information from the DGA server; and
store the received aircraft parameter information in the history buffer of the AMI database;

a management information base (MIB) database configured to collect and store the stored aircraft parameter information from the history buffer of the AMI database;

a parameter snapshot database including aircraft parameter names and aircraft parameter values of the aircraft parameter information stored within the history buffer of the AMI database; and a simple network management protocol (SNMP) agent in operative communication with the MIB database and the parameter snapshot database; and a gateway in operative communication with the SNMP agent, the gateway configured to communicate with a SNMP manager of the ADIF client, the method comprising:

receiving, at the SNMP agent, an aircraft parameter request from the SNMP manager;

decoding, in the SNMP agent, an aircraft parameter name from the aircraft parameter request;

retrieving an aircraft parameter value, based on the decoded aircraft parameter name, from the parameter snapshot database;

creating a response with the retrieved aircraft parameter value in the SNMP agent; and sending the response from the SNMP agent to the SNMP manager.

13. The method of claim 12, wherein the ADIF client is implemented in a portable device, an inflight entertainment server, or a cabin management system.

14. The method of claim 13, wherein the portable device comprises an electronic flight bag.

15. The method of claim 12, wherein the ADIF client is connected to the ADIF server over an Ethernet line.

16. The method of claim 12, wherein the ADIF client is wirelessly connected to the ADIF server.

17. The method of claim 12, further comprising:
initializing one or more logic units in the ADIF server with one or more trap related parameters;
executing the one or more logic units periodically;
identifying any changes in aircraft parameter values of the trap related parameters with the one or more logic units;
generating a trap notification based on the changes in aircraft parameter values in the SNMP agent; and
sending the trap notification from the SNMP agent to the SNMP manager.

18. The method of claim 12, wherein the ADIF server further includes a data gathering application server that is configured to interface with one or more avionics systems through a data network to obtain aircraft parameter information.

19. The method of claim 12, wherein the ADIF server further includes an aircraft condition monitoring function that is configured to host a generic aircraft parameter service (GAPS).

* * * * *